May 15, 1945.  F. J. METZGER  2,376,070
CONTINUOUS PRODUCTION OF ALDOL
Filed Feb. 12, 1943
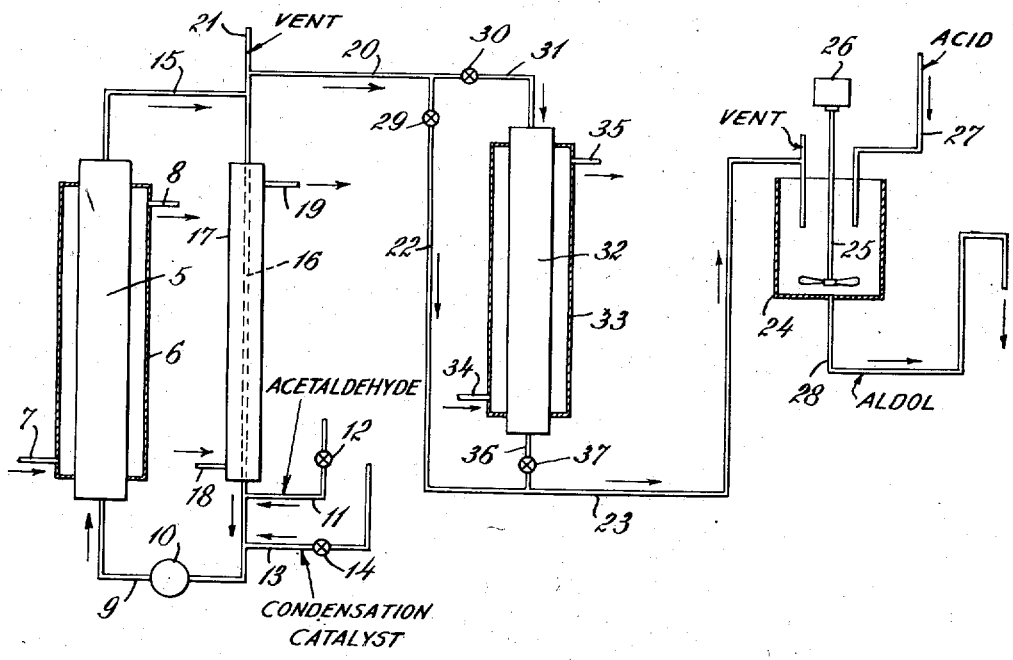
INVENTOR
Floyd J. Metzger
BY
ATTORNEYS Patented May 15, 1945

2,376,070

UNITED STATES PATENT OFFICE 2,376,070

CONTINUOUS PRODUCTION OF ALDOL

Floyd J. Metzger, New York, N. Y., assignor to Air Reduction Company, Incorporated, New York, N. Y., a corporation of New York Application February 12, 1943, Serial No. 475,622

7 Claims. (Cl. 260—602)

This invention relates to the manufacture of aldol and particularly to a continuous cyclic method of condensing acetaldehyde to produce aldol in a commercially practicable and economical manner.

Aldol is formed by the condensation of two molecules of acetaldehyde $$2CH_3CHO \rightarrow CH_3CHOHCH_2CHO$$

The condensation is effected in the presence of an alkaline agent such as an alkali metal hydroxide or a carbonate or an alkaline earth metal oxide.

The condensation or aldolization reaction is exothermic and liberates considerable quantities of heat, i. e. 235 B. t. u. per pound of acetaldehyde condensed. Furthermore the liberation of the heat and the resulting rise in temperature if the heat is not promptly removed, are irregular and difficult to control. If the temperature is not controlled effectively, the increase in temperature will accelerate the reaction with the result that additional heat is released. There is a marked tendency for the reaction to proceed to the point where all of the acetaldehyde is converted to a useless water insoluble resin.

If, during the reaction, the temperature is allowed to rise excessively or the time of reaction is unduly prolonged, the product is contaminated with substances of higher molecular weight than aldol, such as higher polymers of aldol and aldehyde resins. These products decrease the yield of aldol and result in a product of poor quality. Since the distillation of aldol may be carried out only with considerable difficulty and loss, the separation of higher boiling products from aldol is not economically feasible.

Because of the difficulty of controlling the reaction, aldol has been prepared by a batch procedure. It has been suggested that control may be more readily effected by diluting the acetaldehyde with water. This procedure introduces the further difficulty that the aldol contains a large quantity of water which must be removed subsequently at considerable cost.

It is the object of the present invention to provide an effective and economical method of producing aldol by condensation which avoids the difficulties mentioned and permits continuous production of a satisfactory product free from higher boiling impurities.

Other objects and advantages of the invention will be apparent as it is better understood by reference to the following specification and the accompanying drawing, which illustrates diagrammatically an apparatus suitable for the practice of the invention.

I have discovered that the condensation of acetaldehyde to aldol can be controlled satisfactorily and that aldol can be produced in a continuous manner by cycling a solution of acetaldehyde in aldol through a temperature-controlled reaction chamber and adding acetaldehyde and an alkaline catalyst to the cycled solution. The dilution of the acetaldehyde with aldol restrains the vigor of the condensation reaction and particularly the irregular liberation of heat therefrom. It is possible, therefore, to remove the heat effectively and to maintain the desired temperature of the reaction within practical limits.

An amount of the solution equivalent to the additions is withdrawn continuously from the cycle and neutralized with an acid to prevent further reaction. This solution, principally aldol, will contain some unreacted acetaldehyde, a small amount of water, and the neutralized catalyst, but it is free from undesirable higher polymerization products of aldol.

A higher yield of aldol may be obtained if the portion of the solution withdrawn from the cycle is permitted to react further under controlled temperature conditions for a brief period before the catalyst is neutralized. This additional reaction is preferred, but it is not essential to the invention as described, since the initial reaction can be conducted and controlled to afford a satisfactory product.

The temperature of the reaction must be controlled within relatively narrow limits and preferably within the range of 20° to 40° C. It may be somewhat lower or higher. At a temperature of 15° C., the reaction is ordinarily too slow, and at a temperature of 50° C. it tends to be too rapid. Normally, as hereinbefore indicated, it is extremely difficult to control the temperature of the reaction, but by conducting it in the manner indicated no difficulty is experienced in holding the temperature within the desired range by means of ordinary cooling devices such as a jacketed vessel, a coil within a cooling bath, or multiple tubes surrounded by a cooling medium. Water or any other suitable liquid may be used as the cooling agent.

The catalyst employed may be any of the usual alkaline agents such as the hydroxides or carbonates of the alkali metals or the oxides of the alkaline earth metals or similar agents. Sodium hydroxide is the preferred catalyst. The amount of catalyst employed will depend to some extent upon the amount of free acid contained in the acetaldehyde. Freshly distilled acetaldehyde contains little or no free acid, but on standing, especially in contact with the oxygen of the air, acetic acid is formed and must be neutralized before the catalyst becomes effective. The amount of catalyst to be used will depend somewhat upon the other conditions but we have found it advantageous to conduct the condensation within a pH range of 9–11. The catalyst is added preferably in the form of a water solution, but, if desired, it may be added in non-aqueous solution, for example in alcoholic solution.

The rate at which the solution of acetaldehyde in aldol is circulated, the rate of feed of acetaldehyde thereto, and the temperature of the reaction are all mutually dependent, inasmuch as a variation in one may be counterbalanced by the proper change in one or both of the other variables. For instance, a higher feed rate, which would tend to increase the heat of reaction, may be balanced by an increase in cycle rate or by lowering the jacket temperature or both.

Referring to the drawing, 5 indicates the reaction chamber having a jacket 6 which may be supplied with water or other cooling agent through a pipe 7. The cooling agent escapes through a pipe 8. A mixture of approximately 60% aldol and 40% acetaldehyde is introduced to the reaction chamber 5 through a pipe 9 by a pump 10 which maintains the circulation. The cycle system must be substantially filled with this mixture in order that proper cycling through the cooling devices may be ensured. A sufficient amount of a solution of the catalyst to give a pH of 9–11 to the cycling mixture is introduced from a suitable source through pipe 13 controlled by valve 14. Acetaldehyde is continuously fed from a suitable source through pipe 11 controlled by valve 12, and sufficient catalyst solution is continuously fed in the manner above cited to maintain a pH of 9–11 within the cycled solution. In the reaction chamber 5, the acetaldehyde is condensed at a temperature controlled within the desired range by the circulation of the cooling agent through the jacket 6.

The solution escapes through a pipe 15 and is returned through a pipe 16 surrounded by a jacket 17 through which water or other cooling agent is circulated by means of the pipes 18 and 19. The solution thus returns with additions of acetaldehyde and the water solution of the catalyst through the pump 10 to the reaction chamber 5. The rate of circulation is maintained to ensure the most effective reaction.

A portion of the solution is withdrawn continuously through a pipe 20 which is connected with a vent 21 and is delivered through pipes 22 and 23 to a receptacle 24 which is provided with a stirring device 25 driven by a motor 26 or other suitable means. Acid is supplied through the pipe 27 to neutralize the alkali in the product. After neutralization, the product, consisting principally of aldol, is withdrawn through a pipe 28. It may be subjected to any desired further treatment.

In the event that additional reaction is desired, a valve 29 in the pipe 22 is closed and a valve 30 in a branch pipe 31 is opened to deliver the solution to an auxiliary reaction chamber 32 provided with a jacket 33 and pipes 34 and 35 to permit the circulation of water or other cooling media. The reaction continues in the chamber 32 under controlled temperature conditions substantially as in the reaction chamber 5, with the result that a higher proportion of aldol is produced. The solution is delivered through a pipe 36 controlled by a valve 37 to the pipe 23 and is delivered to the receptacle 24 for neutralization.

As an example of the invention, assuming an apparatus as described with a reaction chamber, return pipe, circulating pump and other necessary feed and exit lines having a volume of approximately $\frac{1}{15}$ cubic foot and a cooling surface of approximately 1¾ square feet filled with a 60% aldol, 40% acetaldehyde solution containing sufficient catalyst in the form of a water solution of sodium hydroxide to give a pH of approximately 10 to the reaction mixture, the pump may be operated to cycle the solution through the reaction chamber at the rate of approximately 100 gallons per hour while the temperature of the reaction chamber is held at approximately 30° C. To this system is fed continuously acetaldehyde of a commercial grade at the rate of approximately 6.0 pounds per hour and 4.5% aqueous sodium hydroxide at the rate of about 0.55 pound per hour. From the cycle approximately 6.55 pounds per hour of the reaction mixture are withdrawn, having a specific gravity at 15° C. of about 1.065. This solution is neutralized by the addition of sufficient acetic acid to react with the catalyst. The product consists of approximately 52% aldol, 36% acetaldehyde, 12% water and some sodium acetate, but is free from high boiling impurities.

By utilizing the auxiliary reaction chamber 32, thus affording a longer time for the reaction, the aldol content of the finished product may be increased to 60–70% with corresponding reduction in the proportion of acetaldehyde. By varying other conditions, the yield of aldol can be modified.

The foregoing example is merely illustrative of the preferred conditions of operation. Acetic acid is indicated as the neutralizing agent, but any acid such as hydrochloric or sulphuric, etc., may be employed. In some cases the step of neutralizing may be omitted, for example, when the product is to be subjected immediately to some further treatment, or where the catalyst used is substantially neutral or slightly acid. The invention does not depend upon the use of any particular catalyst. Both acid and alkaline catalysts are available, though the alkaline catalysts are preferred. The rates of feed and the quantities of materials introduced to the system and likewise the amount withdrawn therefrom can be varied over wide ranges without materially altering the results attained.

The invention affords a simple and effective procedure permitting continuous production of aldol free from higher boiling impurities. It avoids the high cost of batch operations and the difficulties inherent in the addition of large quantities of water to the solution.

Various changes may be made in the procedure and the apparatus without departing from the invention or sacrificing the advantages thereof.

I claim:

1. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution.

2. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body adjacent one end thereof, adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution adjacent the other end thereof.

3. The method of producing aldol by condensation of acetaldehyde which comprises maintaining a body of a solution of acetaldehyde and an alkaline catalyst in aldol, maintaining the temperature of said body between 20° C. and 40° C., adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution.

4. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, adding an acid to a part of the withdrawn solution to neutralize the alkaline catalyst therein, cooling another part of the withdrawn portion of the solution, adding acetaldehyde and alkaline catalyst to the cooled part of the withdrawn portion of the solution, and returning the part of the solution which was cooled and to which the acetaldehyde and alkaline catalyst were added to said body of solution.

5. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, maintaining a part of the withdrawn solution under conditions such that condensation of the acetaldehyde therein continues for a further period of time, thereafter adding an acid to said part of the withdrawn portion of the solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution.

6. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution, the amount of alkaline catalyst added to the returned part of the withdrawn solution being sufficient to maintain a pH of from about 9 to 11 in said body of solution.

7. The method of producing aldol by condensation of acetaldehyde which comprises maintaining a body of a solution of acetaldehyde and an alkaline catalyst in aldol, maintaining the temperature of said body between 20° C. and 40° C., substantially continuously withdrawing a portion of the solution from said body, maintaining a part of the withdrawn solution under conditions such that condensation of the acetaldehyde therein continues for a further period of time, thereafter adding an acid to said part of the withdrawn portion of the solution to neutralize the alkaline catalyst therein, cooling another part of the withdrawn portion of the solution, adding acetaldehyde and alkaline catalyst to said cooled part of the withdrawn portion of the solution, and returning the part of the solution which was cooled and to which the acetaldehyde and alkaline catalyst were added to said body of solution, the alkaline catalyst being added to the cooled part of the solution in an amount sufficient to maintain a pH of from about 9 to 11 in said body of solution.

FLOYD J. METZGER.

---

CERTIFICATE OF CORRECTION.

Patent No. 2,376,070.  
May 15, 1945.

FLOYD J. METZGER.

It is hereby certified that error appears in the printed specification of the above numbered patent requiring correction as follows: Page 3, first column, line 23, claim 3, after "40° C.," insert --substantially continuously withdrawing a portion of the solution from said body,--; and that the said Letters Patent should be read with this correction therein that the same may conform to the record of the case in the Patent Office.

Signed and sealed this 14th day of August, A. D. 1945.

(Seal)

Leslie Frazer  
First Assistant Commissioner of Patents.

of the solution, and returning the part of the solution to which the acetaldehyde and alkaline catalyst were added to said body of solution.

2. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body adjacent one end thereof, adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution adjacent the other end thereof.

3. The method of producing aldol by condensation of acetaldehyde which comprises maintaining a body of a solution of acetaldehyde and an alkaline catalyst in aldol, maintaining the temperature of said body between 20° C. and 40° C., adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution.

4. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, adding an acid to a part of the withdrawn solution to neutralize the alkaline catalyst therein, cooling another part of the withdrawn portion of the solution, adding acetaldehyde and alkaline catalyst to the cooled part of the withdrawn portion of the solution, and returning the part of the solution which was cooled and to which the acetaldehyde and alkaline catalyst were added to said body of solution.

5. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, maintaining a part of the withdrawn solution under conditions such that condensation of the acetaldehyde therein continues for a further period of time, thereafter adding an acid to said part of the withdrawn portion of the solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution.

6. The method of producing aldol by condensation of acetaldehyde which comprises maintaining a body of a solution of acetaldehyde and an alkaline catalyst in aldol, controlling the temperature of said body of solution, substantially continuously withdrawing a portion of the solution from said body, adding an acid to a part of the withdrawn solution to neutralize the alkaline catalyst therein, adding acetaldehyde and alkaline catalyst to another part of the withdrawn portion of the solution, and returning the part of the solution to which the acetaldehyde and alkaline catalyst were added to said body of solution, the amount of alkaline catalyst added to the returned part of the withdrawn solution being sufficient to maintain a pH of from about 9 to 11 in said body of solution.

7. The method of producing aldol by condensation of acetaldehyde which comprises maintaining a body of a solution of acetaldehyde and an alkaline catalyst in aldol, maintaining the temperature of said body between 20° C. and 40° C., substantially continuously withdrawing a portion of the solution from said body, maintaining a part of the withdrawn solution under conditions such that condensation of the acetaldehyde therein continues for a further period of time, thereafter adding an acid to said part of the withdrawn portion of the solution to neutralize the alkaline catalyst therein, cooling another part of the withdrawn portion of the solution, adding acetaldehyde and alkaline catalyst to said cooled part of the withdrawn portion of the solution, and returning the part of the solution which was cooled and to which the acetaldehyde and alkaline catalyst were added to said body of solution, the alkaline catalyst being added to the cooled part of the solution in an amount sufficient to maintain a pH of from about 9 to 11 in said body of solution.

FLOYD J. METZGER.

CERTIFICATE OF CORRECTION.

Patent No. 2,376,070.  May 15, 1945.

FLOYD J. METZGER.

It is hereby certified that error appears in the printed specification of the above numbered patent requiring correction as follows: Page 3, first column, line 23, claim 3, after "40° C.," insert --substantially continuously withdrawing a portion of the solution from said body,--; and that the said Letters Patent should be read with this correction therein that the same may conform to the record of the case in the Patent Office.

Signed and sealed this 14th day of August, A. D. 1945.

(Seal)  Leslie Frazer
First Assistant Commissioner of Patents.

Disclaimer 2,376,070.—*Floyd J. Metzger*, New York, N. Y. CONTINUOUS PRODUCTION OF ALDOL.
Patent dated May 15, 1945. Disclaimer filed Nov. 4, 1947, by the inventor;
the assignee, *Air Reduction Company, Incorporated*, assenting.
Hereby enters this disclaimer to claims 1 to 7 inclusive of said Letters Patent.
[*Official Gazette December 9, 1947.*]